United States Patent
Subramaniam et al.

(10) Patent No.: US 6,824,754 B2
(45) Date of Patent: Nov. 30, 2004

(54) SOLID STATE THERMAL METHOD FOR THE SYNTHESIS OF LITHIUM HEXAFLUORO PHOSPHATE (LIPF)$_6$ AS BATTERY ELECTROLYTE

(75) Inventors: Angaiah Subramaniam, Tamil Nadu (IN); Thiagarajan Vasudevan, Tamil Nadu (IN); Ramaiyer Gangadharan, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 304 days.

(21) Appl. No.: 10/095,520

(22) Filed: Mar. 13, 2002

(65) Prior Publication Data

US 2003/0180207 A1 Sep. 25, 2003

(51) Int. Cl.$^7$ ............................................... C01B 25/10
(52) U.S. Cl. ........................................ 423/301; 423/314
(58) Field of Search .................................. 423/301, 314

(56) References Cited

U.S. PATENT DOCUMENTS

| | | | | |
|---|---|---|---|---|
| 2,481,807 A | * | 9/1949 | Anderson | 423/301 |
| 3,314,750 A | * | 4/1967 | Shen | 423/314 |
| 3,380,803 A | * | 4/1968 | Jache et al. | 423/301 |
| 3,607,020 A | * | 9/1971 | Smith | 423/301 |
| 5,378,445 A | | 1/1995 | Salmon et al. | |
| 5,866,093 A | * | 2/1999 | Belt et al. | 423/301 |
| 5,935,541 A | * | 8/1999 | Bonnet et al. | 423/301 |
| 6,387,340 B1 | * | 5/2002 | Na et al. | 423/301 |

OTHER PUBLICATIONS

Mehrotra et al., "Studies in Condensed Phosphates: Part IX–Complex Lithium Polymetaphosphate Derivatives of Some Bivalent Metal Ions", Indian J. Chem., vol. 6, p. 158–160, Mar., 1968, published by Department of Chemistry, University of Rajasthan, Jaipur.

Naejus et al., "Nouveau Procédé de Synthése de L'Hexafluorophosphate de Lithium", Journal of Fluorine Chemistry, vol. 90, p. 81–85, 1998, published by C.N.E.S., Toutouse, France, no month.

International Search Report, Mar. 21, 2002, for PCT/IN02/00056, 5 pages.

* cited by examiner

Primary Examiner—Wayne A. Langel
(74) Attorney, Agent, or Firm—Burns, Doane, Swecker & Mathis, L.L.P.

(57) ABSTRACT

The present invention provides a method for the preparation of LiPF$_6$ (lithium hexafluoro phosphate) wherein equimolar quantities of pure dry AR lithium source such as Li$_2$O or Li$_2$CO$_3$ or LiNO$_3$ is mixed with (very pure dry and AR samples) diammonium hydrogen phosphate in solid state.

19 Claims, No Drawings

SOLID STATE THERMAL METHOD FOR THE SYNTHESIS OF LITHIUM HEXAFLUORO PHOSPHATE (LIPF)$_6$ AS BATTERY ELECTROLYTE

FIELD OF THE INVENTION

The present invention relates to a novel process for the preparation of Lithium hexafluoro phosphate (LiPF$_6$). More particularly, the present invention relates to a novel process for the preparation of Lithium hexafluoro phosphate (LiPF$_6$) which is useful as a battery electrolyte especially for rocking chair cells and other primary non-aqueous lithium based cells and solid state and solid polymer electrolyte lithium cells.

BACKGROUND OF THE INVENTION

LiPF$_6$ is a well-known electrolyte for secondary lithium based cells which is difficult to prepare because of very active raw materials like P$_2$O$_5$, Li$_2$O and PF$_5$ and F$_2$ gases. There are a few chemical procedures available in literature however, they need careful purification and handling. Moreover, such procedures require a wide range of equipment to operate and prepare this essential chemical for rocking chair or lithium ion or intercalation battery systems.

Metal fluorides of phosphorous viz. MPF$_6$ where M is Ca, K or Li can be prepared by reacting MF with PF$_3$. (Paul et. al., *Fluorine Chemistry*, 56, 1995). Hence,

3MF+5PF$_3$→3MPF$_6$+2P

Where M is Ca, K or Cs MPF$_6$ can be prepared by neutralising HPF$_6$ with appropriate base viz., 2HPF$_6$+Ca(OH)$_2$→Ca(MF$_6$)$_2$+2H$_2$O Similarly some of the hexafluorophosphates can be prepared by double decomposition of NH$_4$PF$_6$ or KPF$_6$. (Paul et. al., *Fluorine Chemistry*, 56, 1995; Fluorine Chemistry, Vol. 5, Simons J. H., 131(1819), 1964; Fluorine Chemistry, Vol. 1, Emelson H. J., 76(219), 1995) LiPF$_6$ prepared by earlier methods suffer has certain disadvantages like, they need toxic chemicals as reactants, it becomes difficult to handle the chemicals involved, the final product contains unreacted impurities, it is a partial reaction, it needs further steps for preparation and it is not a pure solid state reaction.

OBJECTS OF THE INVENTION

The main object of this present invention is to provide a novel method for the synthesis of (LiPF$_6$) lithiumhexafluorophosphate as a battery electrolyte.

Another object of this present invention is to provide a complete solid state reaction.

Still another object of this present invention is to avoid many active chemicals which are difficult to handle.

Yet another object of this invention is to avoid obnoxious gases.

Still yet another object of this invention is to get the product without any partial reaction.

These and other objects of the invention are achieved and the problems associated with the prior art are overcome by the process of the invention described below.

SUMMARY OF THE INVENTION

A novel method for the preparation of LiPF$_6$ (lithium hexafluoro phosphate) is developed where in equimolar quantities of pure dry AR lithium source such as Li$_2$O or Li$_2$CO$_3$ or LiNO$_3$ is mixed with (very pure dry and AR samples) diammonium hydrogen phosphate and the mixture was heated to 200°–600° C. continuously for 6 hours in an electric furnace. The product was cooled and was then transferred into a dry vessel. The product was a transparent substance which was confirmed by X-ray analysis as LiAsF$_6$.

Accordingly, the present invention provides a novel solid state thermal process for the synthesis of lithium hexafluoro phosphate (LiPF$_6$), which comprises of:

(a) mixing a lithium source selected from the group consisting of a lithium oxide, a lithium salt and a combination thereof with diammonium phosphate in equimolar proportions;

(b) heating the mixture in a furnace at a temperature in the range of 150° C. to 600° C. continuously to obtain LiPO$_3$;

(c) cooling and powdering the LiPO$_3$ (d) mixing of the powdered product with six to nine times quantitatively of ammonium fluoride and then heating it at a temperature in the range of 150° C. to 200° C. using a furnace continuously for 4–6 hours in a closed Teflon container;

(e) transferring the product to a dry vessel.

In one embodiment of the invention, step (b) above is carried out for a time in the range of 4 to 6 hours.

In an embodiment of the present invention LiPO$_3$ is mixed with NH$_4$F in the ratio 1:6–9 to form LiPF$_6$.

In another embodiment of the present invention, lithium meta phosphate (LiPO$_3$) is mixed with ammonium fluoride in a ratio of 1:7 and the mixture heated to 200° C. in an electric furnace for 6 hours continuously to get lithium hexafluoro phosphate.

In yet another embodiment of the present invention Li$_2$CO$_3$ or Li$_2$O or LiNO$_3$ is mixed with diammonium hydrogen phosphate and ammonium fluoride in the molar ratios 1:2:6–9

In another embodiment of the present invention Li$_2$CO$_3$ or Li$_2$O or LiNO$_3$ is mixed with diammonium hydrogen phosphate and ammonium fluoride in the ratio of 1:1:7.

In yet another embodiment of the present invention, Li$_2$O or LiNO$_3$ is mixed with diammonium hydrogen phosphate and ammonium fluoride in the ratio 1:1:7 and the mixture is heated at 200° C. continuously for 12 hours in an electric furnace to obtain LiPF$_6$.

In an embodiment of the present invention Li$_2$CO$_3$ or Li$_2$O or LiNO$_3$ is mixed with diammonium phosphate in the ratio 1:1 and then, the product is mixed with NH$_4$F in the ratio of 1:7 and heated.

In still another embodiment of this invention the temperature is kept between 150–350° C. for the preparation of LiPF$_6$ when LiNO$_3$ or Li$_2$O in the starting material.

In another embodiment of the invention, for Li$_2$CO$_3$ the temperature of heating with (NH$_4$)$_2$HPO$_4$ is around 600° C. and subsequently with NH$_4$F mixed and heating the temperature is kept in between 150–350° C.

In another embodiment of the invention, the reactions occur in solid state.

In yet another embodiment of the invention, the process comprises a two step reaction as follows:

(a)

$$2(NH_4)_2HPO_4 + Li_2O \xrightarrow{300°\ C.} 2LiPO_3 + 4NH_3 + 3H_2O$$

$$2(NH_4)_2HPO_4 + Li_2CO_3 \xrightarrow{600°\ C.} 2LiPO_3 + 4NH_3 + CO_2 + 3H_2O$$

-continued

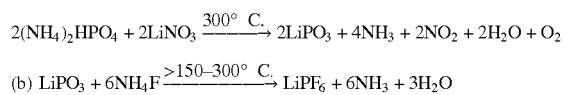

(b) $LiPO_3 + 6NH_4F \xrightarrow{>150-300°\ C.} LiPF_6 + 6NH_3 + 3H_2O$

In yet another embodiment of this invention a single step process is possible at a temperature>150–300° C.

$Li_2O + 2\ (NH_4)_2HPO_4 + 12\ NH_4F \rightarrow 2\ LiPF_6 + 16NH_3 + 9H_2O$ $Li_2CO_3 + 2\ (NH_4)_2HPO_4 + 12\ NH_4F \rightarrow 2\ LiPF_6 + 16NH_3 + CO_2 + 9H_2O$ $LiNO_3 + 2\ (NH_4)_2HPO_4 + 12\ NH_4F \rightarrow 2\ LiPF_6 + 16NH_3 + NO_2 + 9H_2O$ In another embodiment of the present invention, pure dry $Li_2O$ or $Li_2CO_3$ or $LiNO_3$ is mixed with twice the quantity of diammonium phosphate i.e., in the molar ratio of 1:2 and the mixture is heated in an electric or muffle furnace for 6 hours at a temperature of 600° C. continuously for $Li_2CO_3$ and around 300° C. for $Li_2O$ and $LiNO_3$. The product was dried at 80° C. and was then allowed to react with $NH_4F$ in the molar ratio of 1:>6–8 for 4 hours in an electric furnace continuously at a temperature range of 150–350° C.

In yet another embodiment of this invention all materials are in solid state conditions.

It is a feature of this invention that an electrical furnace can be used for the process.

It is another feature of this invention that a muffle furnace can be used for the process.

In yet another embodiment of this invention a single step process is possible viz., (a) $LiPO_3 + 6NH_4F \xrightarrow{>150-300°\ C.} LiPF_6 + 6NH_3 + 3H_2O$

DETAILED DESCRIPTION OF THE INVENTION

Lithium hexafluoro phosphate, is an essential chemical for rocking chair cells, lithium ion cells or intercalation battery systems. However, the process for preparing this compound by earlier methods is difficult and has many drawbacks.

The present invention relates to a novel solid state thermal process for the preparation of $LiPF_6$, which overcomes the previous difficulties. It comprises of a solid state reaction of a lithium salt or a lithium oxide or a combination of both with diammonium phosphate in equimolar proportions obtaining a mixture of the two compounds. The mixture is then heated in a furnace at 600° C. and the product obtained is powdered after cooling. It is then mixed with ammonium fluoride six times the quantity of $LiPO_3$ obtained, from the reaction, and then heated at 200° C. using a furnace continuously for 4–6 hours in a closed Teflon container.

The main advantages of the present invention are that first, there are no side reactions, second a single step or double step process can be possible depending on the method of approach, third, a pure sample of $LiPF_6$ is obtained, fourth, it is a purely solid state reaction under thermal control as no gases or liquids are used even for the initial reaction, fifth, the purity of the product depends on the purity of the reactants and last, the process is simple, uncomplicated and highly efficient.

The invention will now be described in greater detail with reference to the following examples, which are illustrative and therefore should not be construed as limiting the scope of the present invention in any manner:

EXAMPLE 1

An equimolar mixture of $Li_2CO_3$ (AR) and $(NH_4)2HPO_4$ (AR) are ground well and mixed together and heated to 600° C. in an electric/muffle furnace for 6 hours continuously and then product was ground well and mixed with $NH_4F$ (AR) and the mixture was heated again in the electrical furnace/muffle furnace for 4 hours at a temperature of 200° C.

| Components | Composition |
|---|---|
| First step | |
| $Li_2CO_3$ | 0.74 g |
| $(NH_4)_2HPO_4$ | 1.32 g |
| Particle size of the mixture | 5 mµ. |
| Temperature | 600° C. |
| Time | 6 hours |
| Second step | |
| $NH_4F$ | 2.6 g |
| Temperature | 600° C. |
| Time | 4 hours |
| Nature of the product | transparent |
| Efficiency of the process | >90% |

EXAMPLE 2

An equimolar mixture of $Li_2O$ (AR) and $(NH_4)_2HPO_4$ (AR) are ground well and mixed together and heated to 600° C. in an electric/muffle furnace for 6 hours continuously and then product was ground well and mixed with $NH_4F$ (AR) and the mixture was heated again in the electrical furnace/muffle furnace for 4 hours at a temperature of 200° C.

| Components | Composition |
|---|---|
| First step | |
| $Li_2O$ | 0.3 g |
| $(NH_4)_2HPO_4$ | 1.32 g |
| Particle size of the mixture | 5 mµ. |
| Temperature | 400° C. |
| Time | 6 hours |
| Second step | |
| $NH_4F$ | 2.6 g |
| Temperature | 200° C. |
| Time | 4 hours |
| Nature of the product | transparent |
| Efficiency of the process | >90% |

EXAMPLE 3

An equimolar mixture of $LiNO_3$ (AR) and $(NH_4)_2HPO_4$ (AR) are ground well and mixed together and heated to 400° C. in an electric/muffle furnace for 6 hours continuously and then product was ground well and mixed with $NH_4F$ (AR) and the mixture was heated again in the electrical furnace/muffle furnace for 4 hours at a temperature of 200° C.

| Components | Composition |
|---|---|
| First step | |
| $LiNO_3$ | 0.69 g |

-continued

| Components | Composition |
|---|---|
| $(NH_4)_2HPO_4$ | 1.32 g |
| Particle size of the mixture | 5 mμ. |
| Temperature | 400° C. |
| Time | 6 hours |
| Second step | |
| $NH_4F$ | 2.6 g |
| Temperature | 200° C. |
| Time | 4 hours |
| Nature of the product | transparent |
| Efficiency of the process | >90% |

EXAMPLE 4

An equimolar mixture of lithium meta phosphate ($LiPO_3$) and ammonium fluoride in the ratio 1:>6–8 is taken and then mixed and ground well and then heated in an electric/muffle furnace then the temperature of heating was continued for 4 hours at 200° C. till the final product was formed.

| Components | Composition |
|---|---|
| First step | |
| $LiNO_3$ | 0.69 g |
| $(NH_4)_2HPO_4$ | 1.32 g |
| Particle size of the mixture | 5 mμ. |
| Temperature | 600° C. |
| Time | 6 hours |
| Second step | |
| $NH_4F$ | 2.6 g |
| Temperature | 600° C. |
| Time | 4 hours |
| Nature of the product | transparent |
| Efficiency of the process | >90% |

EXAMPLE 5

$Li_2O$, $(NH_4)_2HPO_4$ (AR) and $NH_4F$ mixture is taken in the ratio of 1:2:7 and the mixed material is heated in an electric/muffle furnace for 6 hours at a temperature of 300° C. continuously.

| Components | Composition |
|---|---|
| $Li_2O$ | 0.30 g |
| $(NH_4)_2HPO_4$ | 1.32 g |
| $NH_4F$ | 2.60 g |
| Particle size of the mixture | 5 mμ. |
| Temperature | 300° C. |
| Time | 6 hours |
| Nature of the product | transparent |
| Efficiency of the process | >90% |

EXAMPLE 6

$Li_2CO_3$, $(NH_4)_2HPO_4$ (AR) and $NH_4F$ mixture is taken in the ratio of 1:2:7 and the mixed material is heated in an electric/muffle furnace for 6 hours at a temperature of 300° C. continuously.

| Components | Composition |
|---|---|
| $Li_2CO_3$ | 0.74 g |
| $(NH_4)_2HPO_4$ | 1.32 g |
| $NH_4F$ | 2.60 g |
| Particle size of the mixture | 5 mμ. |
| Time | 6 hours |
| Temperature | 600° C. |
| Nature of the product | transparent |
| Efficiency of the process | >90% |

EXAMPLE 7

$LiNO_3$, $(NH_4)_2HPO_4$ (AR) and $NH_4F$ mixture is taken in the ratio of 1:2:7 and the mixed material is heated in an electric/muffle furnace for 4 hours at a temperature of 300° C. continuously

| Components | Composition |
|---|---|
| $LiNO_3$ | 0.69 g |
| $(NH_4)_2HPO_4$ | 1.32 g |
| $NH_4F$ | 2.60 g |
| Particle size of the mixture | 5 mμ. |
| Time | 4 hours |
| Temperature | 300° C. |
| Nature of the product | transparent |
| Efficiency of the process | >90% |

We claim:

1. A solid state thermal process for synthesis of lithium hexafluoro phosphate ($LiPF_6$), which comprises the steps of:
   (a) mixing a lithium source selected from the group consisting of a lithium oxide, a lithium salt and a combination thereof with diammonium phosphate in equimolar proportions to obtain a first mixture;
   (b) heating the first mixture in a furnace at a first temperature in the range of 150° C. to 600° C. continuously to obtain product lithium meta phosphate ($LiPO_3$);
   (c) cooling and powdering the product $LiPO_3$; and
   (d) mixing the powdered product $LiPO_3$ with six to nine times quantitatively of ammonium fluoride to form a second mixture and then heating the second mixture at a second temperature in the range of 150° C. to 200° C. to obtain lithium hexafluoro phosphate.

2. A process as claimed in claim 1 wherein step (b) is carried out for a time in the range of 4 to 6 hours.

3. A process as claimed in claim 1 wherein lithium meta phosphate is mixed with ammonium fluoride in a molar ratio of 1:7 and the second mixture is heated to 200° C. in an electric furnace for 6 hours continuously to obtain lithium hexafluoro phosphate.

4. A process as claimed in claim 1 wherein $Li_2CO_3$ or $Li_2O$ or $LiNO_3$ is mixed with diammonium hydrogen phosphate and ammonium fluoride in a molar ratio of 1:2:6–9.

5. A process as claimed in claim 1 wherein $Li_2CO_3$ or $Li_2O$ or $LiNO_3$ is mixed with diammonium hydrogen phosphate and ammonium fluoride in a molar ratio of 1:1:7.

6. A process as claimed in claim 1 wherein $Li_2O$ or $LiNO_3$ is mixed with diammonium hydrogen phosphate and ammonium fluoride in a molar ratio of 1:1:7 and the second mixture is heated at 200° C. continuously for 12 hours in an electric furnace to obtain $LiPF_6$.

7. A process as claimed in claim 1 wherein $Li_2CO_3$ or $Li_2O$ or $LiNO_3$ is mixed with diammonium phosphate in a molar ratio of 1:1 and the product $LiPO_3$ is mixed with $NH_4F$ in a molar ratio of 1:7.

8. A process as claimed in claim 1 wherein the first temperature is between 150–350° C. when $LiNO_3$ or $Li_2O$ is the lithium source.

9. A process as claimed in claim 1 wherein for $Li_2CO_3$ the first temperature is about 600° C. and the second temperature is between 150–350° C.

10. A process as claimed in claim 1 wherein the reactions occur in solid state.

11. A process as claimed in claim 1 wherein the process comprises a two step reaction as follows:

(a)

$$2(NH_4)_2HPO_4 + Li_2O \xrightarrow{300° C.} 2LiPO_3 + 4NH_3 + 3H_2O$$

$$2(NH_4)_2HPO_4 + Li_2CO_3 \xrightarrow{600° C.} 2LiPO_3 + 4NH_3 + CO_2 + 3H_2O$$

$$2(NH_4)_2HPO_4 + 2LiNO_3 \xrightarrow{300° C.} 2LiPO_3 + 4NH_3 + 2NO_2 + 2H_2O + O_2$$

(b) $LiPO_3 + 6NH_4F \xrightarrow{>150-300° C.} LiPF_6 + 6NH_3 + 3H_2O$

12. A process as claimed in claim 1 wherein the process comprises a single step reaction at a temperature greater than 150 to 300° C.

$$Li_2O + 2(NH_4)_2HPO_4 + 12\ NH_4F \rightarrow 2\ LiPF_6 + 16NH_3 + 9H_2O$$

$$Li_2CO_3 + 2(NH_4)_2HPO_4 + 12\ NH_4F \rightarrow 2\ LiPF_6 + 16NH_3 + CO_2 + 9H_2O$$

$$Li_2NO_3 + 2(NH_4)_2HPO_4 + 12\ NH_4F \rightarrow 2\ LiPF_6 + 16NH_3 + NO_2 + 9H_2O.$$

13. A process as claimed in claim 1 wherein pure dry $Li_2O$ or $Li_2CO_3$ or $LiNO_3$ is mixed with twice the quantity of diammonium phosphate to obtain the first mixture and the first mixture is heated in an electric or muffle furnace for 6 hours at a temperature of 600° C. continuously for $Li_2CO_3$ and about 300° C. for $Li_2O$ and $LiNO_3$ and the product $Li_2CO_3$ is then dried at 80° C. and reacted with $NH_4F$ in a molar ratio of 1:>6–8 for 4 hours in an electric furnace continuously at a temperature range of 150–350° C.

14. A process as claimed in claim 1 wherein all materials are in solid state conditions.

15. A process as claimed in claim 1 wherein the furnace is an electrical furnace.

16. A process as claimed in claim 1 wherein the furnace is a muffle furnace.

17. A process as claimed in claim 1 wherein the process comprises a single step reaction as follows:

(a) $LiPO_3 + 6NH_4F \xrightarrow{>150-300° C.} LiPF_6 + 6NH_3 + 3H_2O.$

18. A process as claimed in claim 1, wherein heating the second mixture at the second temperature includes using a furnace continuously for 4–6 hours in a closed Teflon container.

19. A process as claimed in claim 1, further comprising the step of (e) transferring the lithium hexafluoro phosphate to a dry vessel.

* * * * *